US008693726B2

(12) United States Patent
Karakotsios et al.

(10) Patent No.: US 8,693,726 B2
(45) Date of Patent: Apr. 8, 2014

(54) USER IDENTIFICATION BY GESTURE RECOGNITION

(75) Inventors: Kenneth M. Karakotsios, San Jose, CA (US); Volodymyr V. Ivanchenko, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 341 days.

(21) Appl. No.: 13/172,727

(22) Filed: Jun. 29, 2011

(65) Prior Publication Data

US 2013/0004016 A1  Jan. 3, 2013

(51) Int. Cl.
*G06K 9/00*  (2006.01)

(52) U.S. Cl.
USPC ......................................... 382/103; 348/169

(58) Field of Classification Search
USPC ......... 382/100, 103, 106, 107, 115, 116, 117, 382/118, 181, 190, 195, 203, 206; 348/169–172, 154, 155; 902/3–5; 340/5.1, 5.2, 5.21, 5.82, 5.83; 283/67–69
See application file for complete search history.

(56) References Cited

U.S. PATENT DOCUMENTS

| | | | |
|---|---|---|---|
| 6,222,465 B1 * | 4/2001 | Kumar et al. ................... 341/20 |
| 6,421,453 B1 * | 7/2002 | Kanevsky et al. ............ 382/115 |
| 6,681,031 B2 * | 1/2004 | Cohen et al. .................. 382/103 |
| 7,725,547 B2 * | 5/2010 | Albertson et al. ............ 709/206 |
| 8,378,970 B2 * | 2/2013 | Nishida et al. ................ 345/158 |
| 2003/0156756 A1 * | 8/2003 | Gokturk et al. ............... 382/190 |
| 2006/0013440 A1 * | 1/2006 | Cohen et al. .................. 382/103 |
| 2008/0170776 A1 * | 7/2008 | Albertson et al. ............ 382/154 |
| 2009/0102788 A1 | 4/2009 | Nishida et al. |
| 2009/0103780 A1 * | 4/2009 | Nishihara et al. ............ 382/103 |
| 2010/0052851 A1 | 3/2010 | Kaehler |
| 2011/0001813 A1 * | 1/2011 | Kim et al. ....................... 348/77 |
| 2011/0026765 A1 | 2/2011 | Ivanich et al. |

OTHER PUBLICATIONS

"International Search Report dated Sep. 7, 2012", International Application No. PCT/US2012/044341, Sep. 7, 2012, 2 pages.

* cited by examiner

*Primary Examiner* — Anand Bhatnagar
(74) *Attorney, Agent, or Firm* — Novak Druce Connolly Bove + Quigg LLP

(57) ABSTRACT

A user can be identified and/or authenticated to an electronic device by analyzing aspects of a motion or gesture made by that user. At least one imaging element of the device can capture image information including the motion or gesture, and can determine time-dependent information about that motion or gesture in two or three dimensions of space. The time-dependent information can be used to identify varying speeds, motions, and other such aspects that are indicative of a particular user. The way in which a gesture or motion is made, in addition to the motion or gesture itself, can be used to authenticate an individual user. While other persons can learn the basic gesture or motion, the way in which each person makes that gesture or motion will generally be at least slightly different, which can be used to prevent unauthorized access to sensitive information, protected functionality, or other such content.

27 Claims, 6 Drawing Sheets

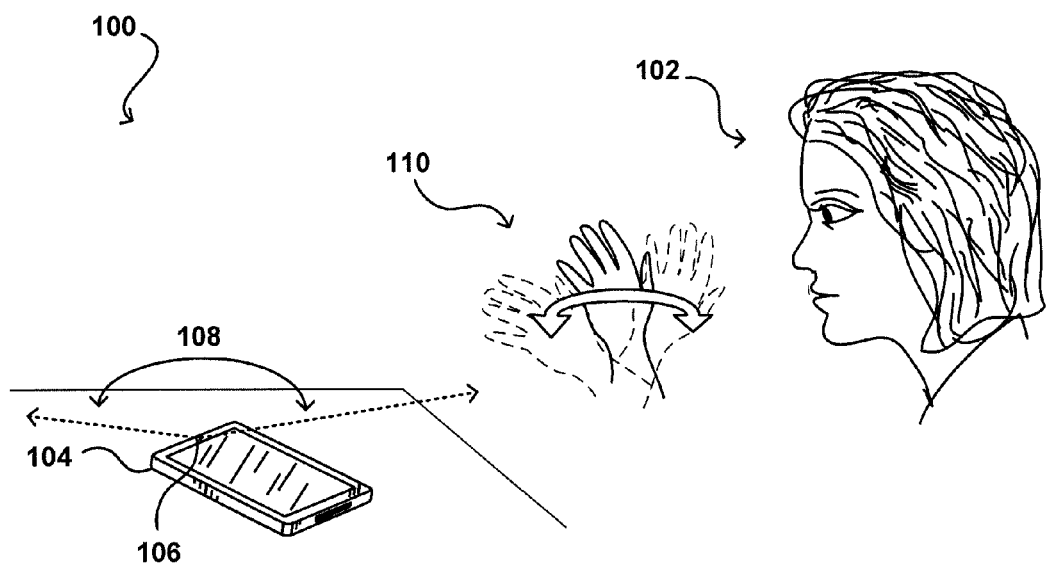
FIG. 1
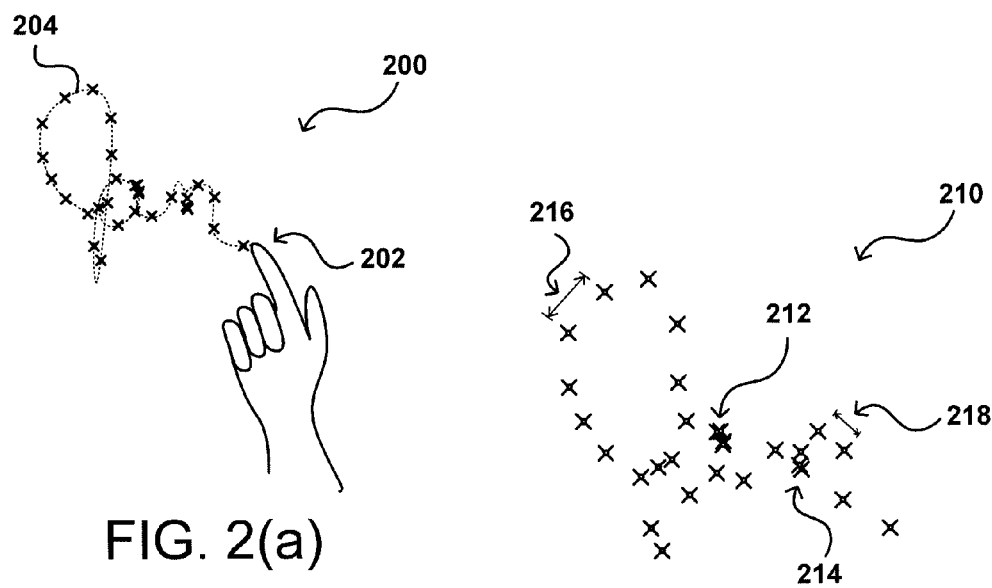
FIG. 2(a)
FIG. 2(b)

USER IDENTIFICATION BY GESTURE RECOGNITION

BACKGROUND

People are increasingly interacting with computers and other electronic devices in new and interesting ways. One such interaction approach involves making a detectable motion with respect to a device, which can be detected using a camera or other such element. While simple motions can be detected to provide input, there generally is no way to determine the identity of the person making the gesture, unless there is another process being used in combination such as facial recognition, which can be very resource intensive, particularly for mobile devices. If the motion is being made in contact with a display screen or other touch sensitive surface, a pattern such as a signature can be recognized to identify the person. In many cases, however, a person can learn to approximate another person's signature with enough accuracy to provide authentication. Further, a user might not appreciate having to continually be in contact with the device in order to provide for authentication of the user.

BRIEF DESCRIPTION OF THE DRAWINGS

Various embodiments in accordance with the present disclosure will be described with reference to the drawings, in which:

FIG. 1 illustrates an example environment in which various aspects can be implemented in accordance with various embodiments;

FIGS. 2(a) and 2(b) illustrate an example motion that can be used as an identifier in accordance with various embodiments;

DETAILED DESCRIPTION

Figures 3A, 3B:
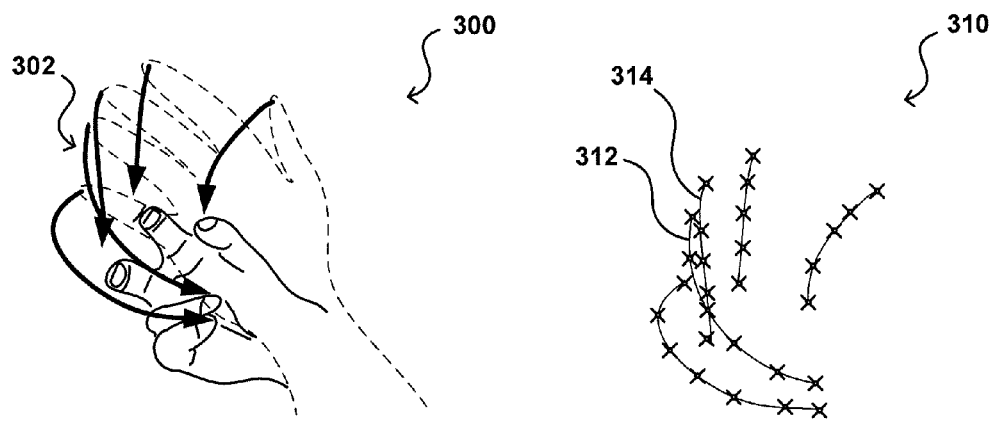
FIGS. 3(a) and 3(b) illustrate an example motion and gesture that can be used as an identifier in accordance with various embodiments.

Systems and methods in accordance with various embodiments of the present disclosure may overcome one or more of the aforementioned and other deficiencies experienced in conventional approaches to providing user identification to an electronic device. In particular, various embodiments enable a user to perform a specific motion or gesture associated with that user, which can be analyzed by the electronic device (or a system, device, or service in communication with the electronic device) to verify the identity of the person performing the motion or gesture. The electronic device can capture image information including at least a portion of the user, and analyze that image information to determine information about a motion or gesture, where that information can include position information for one or more features of the user at one point in time and/or changes in the position information over a period of time. The position information can be compared to position information stored for the user for use in identifying that user, based upon the motion or gesture.

In various embodiments, a user can perform a signature or other specific motion or gesture at a distance from an electronic device that can be captured by at least one imaging element of the device. The captured information can be analyzed to determine the location of at least one feature, such as a user's fingertip, in the image information. The motion of that feature over time then can be tracked, with a location of that feature being determined to correspond to a point in two- or three-dimensional space. The location also can be stored with a timestamp or other such temporal information enabling speeds and/or accelerations of a motion of gesture formation to be determined in addition to the path of the motion or gesture itself. While unique signatures or motions can be difficult for another person to replicate, it can be especially difficult for a person to mimic the varying speeds and motions by which another person performs various parts of a motion or gesture formation. Such an approach can further be beneficial when using gestures or motions for user identification, as a user might forget a complex gesture used to identify that user to a device, but if the gesture is forming the user's name or something otherwise easily recognizable in the air the user will likely remember the basic gesture. Further, motor memory is generally quite powerful, such that a user will tend to form a gesture such as the user's signature or initials in the air with similar speeds and motions even after a significant passage of time.

In at least some embodiments, a user can utilize motions or gestures that utilize more than one point of reference. For example, a user might make a gesture with two or more fingers, with the motion of each of those fingers being currently tracked over time and compared to known identification information. Similarly, a user might use two hands, eyes, elbows, held object, or any of a number of other features that can be tracked and analyzed for purposes of user identification.

In some embodiments, a user might not even need to make a motion to be captured, but instead can utilize a specific "static" gesture. For example, a user might form a specific letter in sign language as an identifier. In some embodiments, the motion the user uses to form that gesture can be considered. In other embodiments, however, the analysis might instead include the relations of various feature points in the gesture. For example, different users will have different relative finger lengths, palm widths, forearm lengths, and other such aspects, which can be combined with the gesture to help in determining a particular person's identity.

A user can provide one or more motions or gestures over time to be used in identifying that user. For example, a user might be identified to a device through a password or signature validation or other such process. Once the user is identified, the user can perform a motion or gesture that is to be associated with that user for use in subsequent identification. One or more algorithms might analyze the motion or gesture and provide a "strength" or other such score or rating indicating how likely it will be that a user cannot replicate that motion, such as may be based on variations in speed or acceleration, number of features that can be tracked, etc. The user then can perform gestures or motions until the user is satisfied with the result (or another criterion is met), and can periodically update the associated motion or gesture in order to provide added security.

Various lighting and capture approaches can be used in accordance with various embodiments. For example, ambient light or infrared imaging can be used to determine the location of various features relative to the device. In some embodiments, a combination of ambient and infrared imaging can be used to remove background objects from the captured image information in order to simplify, and improve the accuracy of, image processing. The information can be captured using any appropriate sensor or detector, such as a digital camera or infrared detector. Further, two or more imaging elements can be used together in at least some embodiments to provide position information in three dimensions. Using image information as opposed to data from accelerometers or other types of components can be further beneficial, as information such as velocity and position can often be determined with more accuracy using the captured image information.

Various other applications, processes and uses are presented below with respect to the various embodiments.

FIG. 1 illustrates an example situation 100 wherein a user 102 would like to provide gesture- and/or motion-based input to a computing device 104, such as to provide an identity of that user to the device for purposes of, for example, securely unlocking functionality on the device. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, and portable media players, among others. In this example, the computing device 104 has at least one image capture element 106 operable to perform functions such as image and/or video capture. Each image capture element may be, for example, a camera, a charge-coupled device (CCD), a motion detection sensor, or an infrared sensor, or can utilize another appropriate image capturing technology.

In this example, the user 102 is performing a selected motion or gesture using the user's hand 110. The motion can be one of a set of motions or gestures recognized by the device to correspond to a particular input or action, or can be a specific motion or gesture associated with that particular user for identification purposes. If the motion is performed within a viewable area or angular range 108 of at least one of the imaging elements 106 on the device, the device can capture image information including at least a portion of the motion or gesture, analyze the image information using at least one image analysis, feature recognition, or other such algorithm, and determine movement of at least one feature of the user between subsequent frames or portions of the image information. This can be performed using any process known or used for determining motion, such as locating "unique" features in one or more initial images and then tracking the locations of those features in subsequent images, whereby the movement of those features can be compared against a set of movements corresponding to the set of motions or gestures, etc. Other approaches for determining motion- or gesture-based input can be found, for example, in co-pending U.S. patent application Ser. No. 12/332,049, filed Dec. 10, 2008, and entitled "Movement Recognition and Input Mechanism," which is hereby incorporated herein by reference.

In some embodiments, a user might select a motion that is to be used to identify that user to an electronic device. For example, FIG. 2(a) illustrates an example situation 200 wherein a user authenticates himself or herself to an electronic device by using an index finger to "write" the user's signature in the air in front of the device, within a capture range of at least one image capture element of the device. The information captured by the image capture element can be analyzed to determine a location of a specific feature in each frame or other segment of information, in order to track the position of that feature over time. In this example, the feature being tracked is the user's fingertip 202. The fingertip position can be determined, for example, through image analysis of a camera-captured image or intensity analysis of reflected IR radiation in a sensor-captured image. Various other imaging approaches can be used as well. As illustrated, while the user's fingertip 202 is forming the "signature" in the air, the captured image information can be analyzed to determine a set of points along the signature, each corresponding to a determined point of the user's fingertip at a respective point in time, such as a time of capture of a respective frame of image information. An appropriate point to use in the image information for the fingertip in a given image frame, for example, can be determined using an appropriate method such as a local maxima determination or centroid determination, etc.

The captured image information can be analyzed to determine a period over which a detected motion might correspond to a gesture or other such input. In many embodiments, it may be too resource intensive to analyze every frame of captured video, unless the device is in a low frame rate or other such mode. In some embodiments, the device will periodically analyze captured image information to attempt to determine if a feature in the image information appears to indicate a user making a motion or gesture. In at least some embodiments, this can cause the device to begin to capture information with a higher frame rate or frequency, during which time a gesture or input analysis algorithm can be used to analyze the information. In other embodiments, the device might utilize a rolling buffer of image information, keeping image information from a recent period, such as the last ten seconds. When a possible gesture or user motion is detected, the device might also analyze the information in the buffer in case the device missed the beginning of a motion or gesture at the time of motion detection. Various other approaches can be used as well as should be apparent in light of the teachings and suggestions contained herein.

FIG. 2(b) illustrates an example set of points 210 that can be captured for a motion such as that illustrated in FIG. 2(a). In at least some embodiments, these points are captured at relatively equidistant points in time. In some embodiments, such as where there is a single camera, the points might be determined in two dimensions (x, y). If depth information is capable of being determined, such as where there are two or more image capture elements doing triangulation or stereoscopic imaging, for example, the points might instead be determined in three dimensions (x, y, z) in space. The collection of points for a given motion or gesture then can be compared against sets of points stored in a library or other such data repository, where each of those sets corresponds to a particular user, motion, gesture, or other such aspect. Using one or more point-matching algorithms, the determined collection of points can be compared against at least a portion of the stored sets until a set of points matches with a minimum level of certainty or confidence, etc. (or until there are no more sets of points to attempt to match). In some embodiments, a curve or continuous line or function can be fit to the collection of points and compared against a set of curves, for example, which can help improve the matching process in embodiments where the points are relatively far apart and the timing of those points can potentially otherwise affect the matching process.

In at least some embodiments, the process can further take advantage of the fact that the device can provide timing (absolute or relative) information for each point or between each pair of points. Thus, each point can have an additional dimension (x, y, t) or (x, y, z, t) that can including timing information in addition to positional information. As mentioned above, one person might learn how to trace out the signature of another person with a reasonable degree of accuracy. It will be much harder, however, for a person to also learn the varying speed and/or motion with which another person forms that signature (or other motion, gesture, etc.) Thus, having timing information in addition to position information can help to more accurately identify the person making the motion or gesture.

The sets of points can further be encoded according to any appropriate standard or framework. In some embodiments, each tracked or monitored point or feature of a user or other object can correspond to a stream of relatively continuous points. For multiple points (i.e., when tracking all five fingers of a user's hand) there can be multiple encoded streams. Each stream can be stored as a sequence of points for matching against one or more known sequences of points. In at least some embodiments, each point has a timestamp enabling speed, acceleration, or other such information to be determined. For a given feature, such as a user's hand, there might be ten features (e.g., brightest or closest points, identified feature points, etc.) that are monitored at an appropriate sample rate, such as between 100 Hz and 1 kHz, or at around 120 Hz for at least one embodiment. Such an approach might result in around one thousand points for a second-long period of time, which can provide a desired level of accuracy for identification while avoiding the processing of potentially millions of points if trying to do conventional image-based tracking. In some embodiments, an algorithm might attempt to further reduce the number of points to be tracked and/or analyzed, such as when a given feature does not move substantially between capture times, etc.

In FIG. 2(b) the points can be analyzed to determine that the user making the gesture moves the fastest during a portion of forming the cursive "j" as indicated by separation 216. The user might move the slowest around a turn-around point, such as near a portion 212 of the cursive "a" where the points are significantly close together. The portion of the signature near the end 218 for this user might be at a speed roughly in-between. By looking at the relative distances between adjacent points in both position and time, a set of speeds and/or accelerations (or relatively continuous speed function, etc.) can be determined for the signature. This speed-related information then can also be compared against stored information for one or more users, and used to find a more accurate match than for position or trajectory alone. For example, two users might be able to sign the name "Jan" with sufficient similarity, but the motion and speeds they user to form that name will typically be significantly different, providing a more accurate identification result when receiving the signature from one of those users. In some embodiments, a set of speeds between each point can be determined for matching, while in other embodiments speeds and/or accelerations can be determined for specific points or regions of the gesture, as may correspond to areas of highest and lowest speed, etc.

In at least some embodiments, a device might track more than one point or feature over time. For example, FIG. 3(a) illustrates an example situation 300 wherein a user makes a gesture that involves all five fingers, here going from an open hand to a particular configuration of the user's fingers. If the location of each fingertip is able to determined from the captured image information, the relative motion of each fingertip can be tracked in position and/or time. The motion of each fingertip can form a path 302, which can be analyzed using an approach such as those described above with respect to a single finger. In addition, however, the paths can also be compared with each other to provide additional information. For example, each user may have fingers of different length and hands of different size and shape, and might use slightly different separations during the motion and/or at the ends of the motion. Thus, in addition to getting five times the information from the five separate paths, the information can also be used to determine relative speeds and/or positions between the different features.

For example, FIG. 3(b) illustrates an example set of points 310 that could be determined for the motion of FIG. 3(a). In this example, it can be seen that the path of travel for each finger can be different, as well as the speed of each path. Further, these paths can have a distinct orientation with respect to each other. For example, when this particular user makes the gesture, the paths 312 and 314 of two different fingers cross by a certain amount. For another user, the paths might cross by a different amount, or may not cross at all. Thus, the relative motions of multiple features can be yet another indicator of the identity of a person, as the way a user makes multiple motions can be compared against each other as well.

Figure 4:
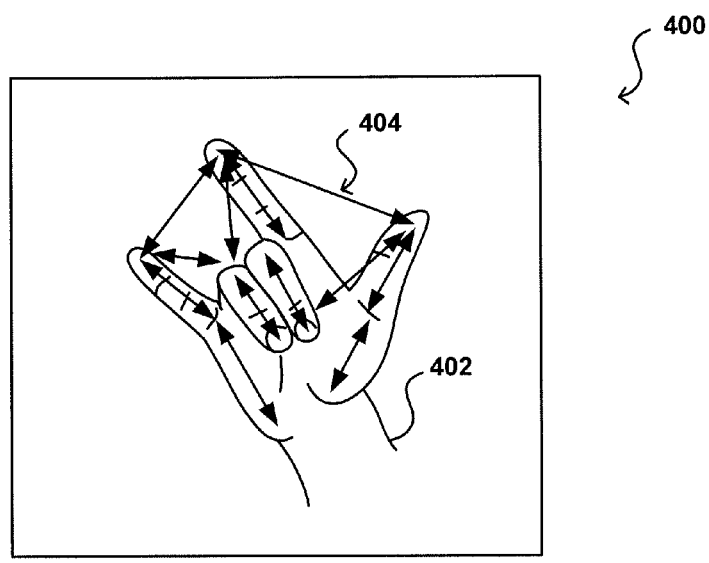
FIG. 4 illustrates an example gesture that can be used as an identifier in accordance with various embodiments.

Further still, the image information can be analyzed to determine one or more physical characteristics of the user. For example, FIG. 4 illustrates an example image 400 captured showing a gesture being formed by the hand of a user 402. The user might have formed this gesture using a particular motion, as discussed above, or might simply want to use this particular configuration as an identifier. As discussed above, the image information can be analyzed to determine the location of specific features in the gesture, such as the distance 404 between adjacent fingertips, etc. In addition, however, various other factors can be analyzed as well, such as the relative lengths of each finger, palm dimensions, relative separations of fingers while making the gesture, and any of a number of other such aspects that might be unique for, and thus indicative of, a particular user. In this way, even if another person learns the user's identifying gesture, unless that other person has physical features substantially similar to those of the user, the person will be unable to fake a device into identifying that person as the user of the device, etc. If available, other information can be used as well, such as the relative length of the user's forearm, thickness of the user's wrist, or other such information.

Figure 5A:
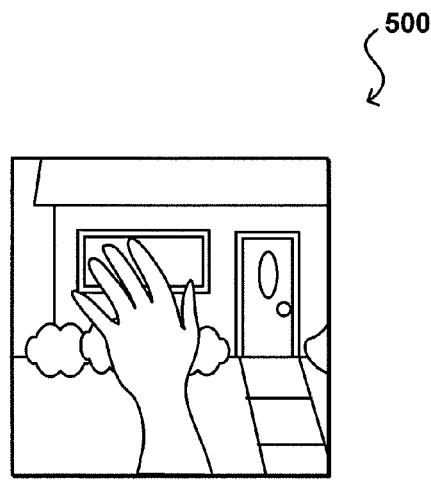
FIGS. 5(a), (b), (c), and (d) illustrate example images for analysis with different types of illumination in accordance with various embodiments.

As mentioned, various types of information can be used to attempt to locate and track specific features over time. One approach utilizes ambient-light imaging with a digital camera (still or video) to capture images that can be analyzed with an image recognition algorithm. As is known in the art, and as illustrated in the example image 500 of FIG. 5(a), however, ambient light images can include information for a number of different objects and thus can be very processor and time intensive to analyze. For example, an image analysis algorithm would not only have to differentiate the hand from the door and sidewalk in the image, but would also have to identify the hand as a hand, regardless of the hand's orientation. Such an approach can require shape or contour matching, for example, which can still be relatively processor intensive. A less processor intensive approach would be to separate the hand from the background before analysis.

Figure 5B:
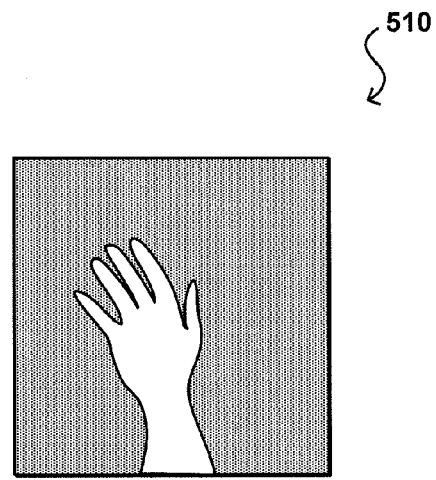

In at least some embodiments, a light emitting diode (LED) or other source of illumination can be triggered to produce illumination over a short period of time in which an image capture element is going to be capturing image information. With a sufficiently fast capture or shutter speed, for example, the LED can illuminate a feature relatively close to the device much more than other elements further away, such that a background portion of the image can be substantially dark (or otherwise, depending on the implementation). For example, FIG. 5(b) illustrates an example image 510 wherein an LED or other source of illumination is activated (e.g., flashed or strobed) during a time of image capture of at least one gesture sensor. As can be seen, since the user's hand is relatively close to the device the hand will appear relatively bright in the image. Accordingly, the background images will appear relatively, if not almost entirely, dark. This approach can be particularly beneficial for infrared (IR) imaging in at least some embodiments. Such an image can be much easier to analyze, as the hand has been effectively separated out from the background, and thus can be easier to track through the various images. Further, there is a smaller portion of the image to analyze to attempt to determine relevant features for tracking. In embodiments where the detection time is short, there will be relatively little power drained by flashing the LED in at least some embodiments, even though the LED itself might be relatively power hungry per unit time.

Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

Figure 5C:
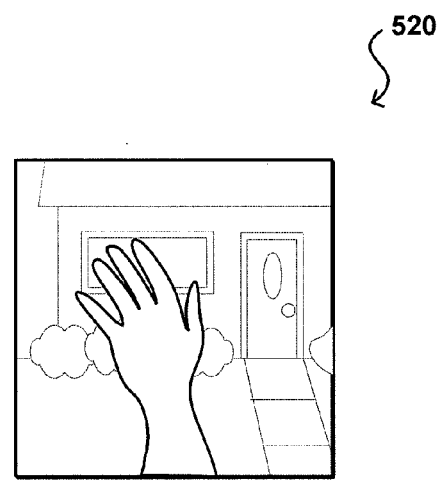

In embodiments where there is not a sufficiently fast shutter, where there is a rolling shutter effect, or in other such situations, it might be difficult to substantially prevent detecting reflections from other objects near the device. For example, FIG. 5(c) illustrates an example image 520 that could be captured using an infrared (IR) sensor, for example, wherein the hand is easier to locate in the image but the background is still present enough that an image processing algorithm might have to process other objects in the image, or might not be able to quickly locate a specific feature with a minimum level of certainty. In at least some embodiments, a device can capture both an ambient light image, such as in FIG. 5(a), and a reflected IR image, such as in FIG. 5(b). By having both images, one or more algorithms can be used to shift the images (to account for distance offset of the imaging elements) and then subtract the ambient light image 500 from the reflected IR image 520. The resulting image would be substantially dominated by the hand of the user. In at least some embodiments, a weighted subtraction can be performed when it is determined (due to contrast, lighting, or other such aspects) that the background information is likely much more intense in the ambient light image than the IR image, and vice versa. In some cases, a set of weighted comparisons can be performed until one or more features can be located with a minimum level of confidence.

Figure 5D:
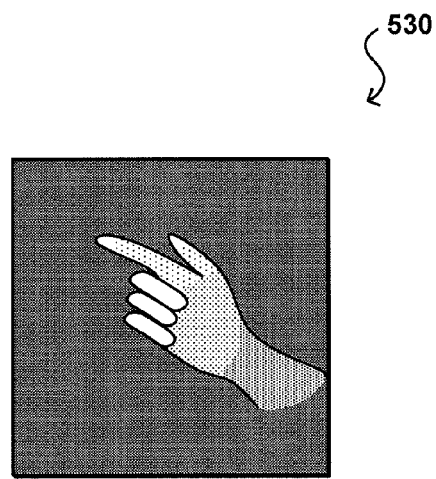

In at least some embodiments, the intensity of the reflected IR can be used to determine one or more features to be tracked between images. For example, in the example IR image 530 of FIG. 5(d) the user is using a single finger to perform a motion as input to the device. In such an example, the tip of the user's finger typically will be the closest portion of the user's hand to the device. Thus, if the relative brightness can be determined with an acceptable level of differentiation, the tip of the user's finger can be determined at least in part by looking for the brightest region in the IR image. Other features such as the tip of the user's thumb or parts of other fingers might appear relatively bright as well, which can help to determine additional points to track that can be further indicative of an identity of the user.

Figure 6:
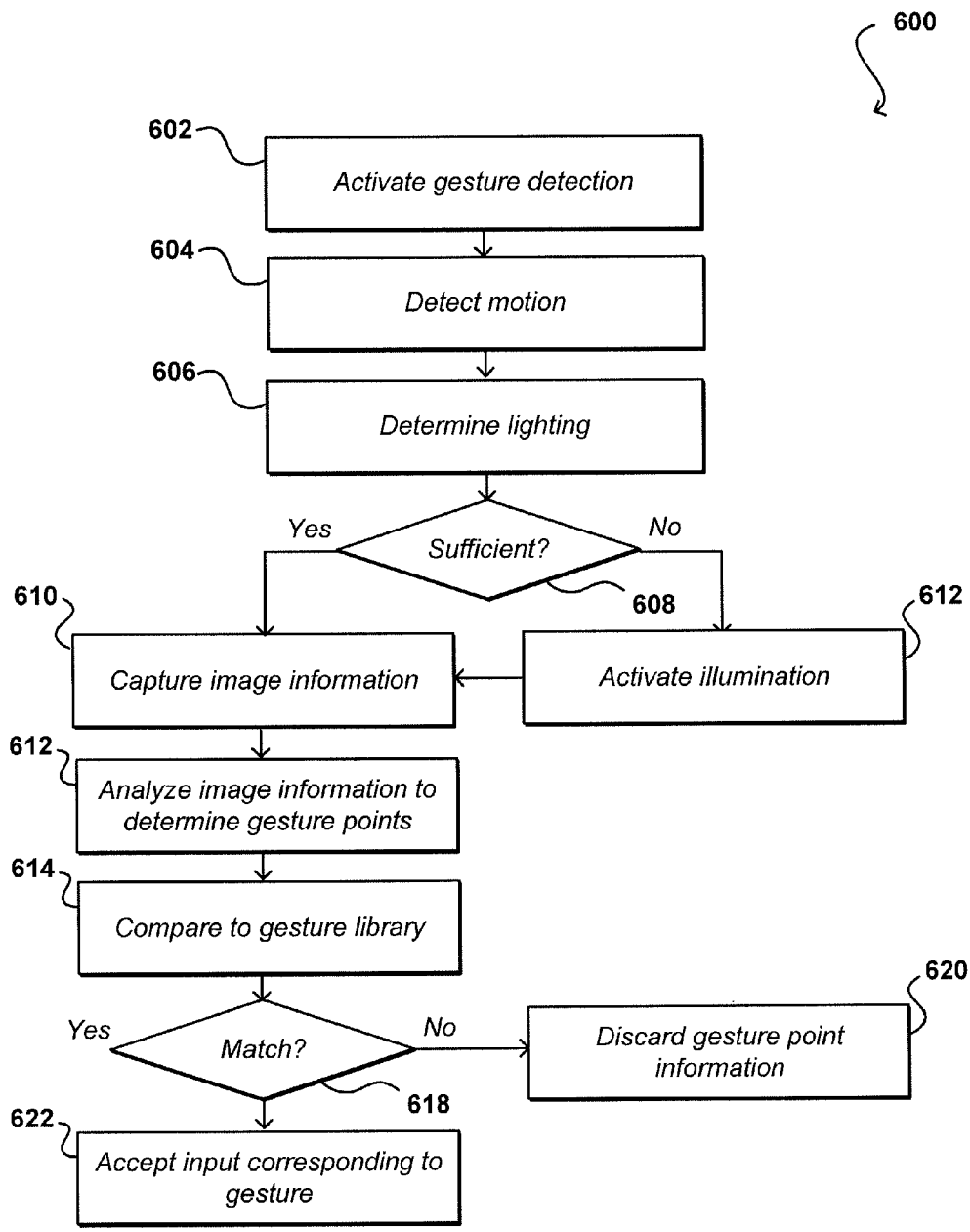
FIG. 6 illustrates an example process for determining user identity that can be performed in accordance with various embodiments.

FIG. 6 illustrates an example process 600 for enabling gesture identification for such a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In this example, gesture detection is activated on a computing device 602. In at least some embodiments this is activated manually by the user or upon activation of an application, for example, but can also be continually active in at least a low power state in other embodiments.

In this example, a computing device might run in a low power or low resolution mode, such as where there has not been recent gesture input. Such a mode can comprise, for example, capturing image information at a lower capture rate or analyzing captured information less frequently. In at least some embodiments, the device will change into a different mode or otherwise activate certain functionality once motion is detected 604, whether through image analysis, use of a motion detector, etc. In this example, a light detector or other such mechanism (hardware and/or software analyzing the captured image information) can determine whether there is sufficient lighting 606. If it is determined that the light is not sufficient 608, or if light is otherwise needed (such as for IR illumination), one or more illumination sources can be activated 612 before subsequent image information is captured 610. As mentioned elsewhere herein, the illumination source can be any appropriate source operable to provide an adequate amount and/or type of illumination (e.g., white light or IR), at any appropriate time (e.g., continuously during image capture or strobed with a timing of the capture).

The captured image information, which can include cached or other such temporarily stored image information as discussed above, can be analyzed to attempt to determine one or more gesture points 612. As discussed, this can include user features recognized in a string of images, bright regions in IR image information, points of a certain proximity or distance in the image information, etc. One or more algorithms can not only attempt to locate such points or features, but also determine coordinates or other appropriate values and track values for those points between successive frames or other portions of the captured image information. As discussed, this can include capturing information for one or more points from an image capture stream and storing values for those points as a potential gesture set.

If the analyzed information is indicative of a potential gesture and a set of potential gesture points can be obtained, this potential gesture set can be compared against one or more gesture patterns in a gesture library 614 or other such source. Any appropriate matching algorithm can be used as discussed or suggested herein, or as is known or used in the art for attempting to match point sets, functions, paths, or other such features. If no match can be found with at least a minimum confidence, level of certainty, or other such criterion or threshold 618, the gesture point information (and associated image information) can be discarded 620. If a match can be determined with an appropriate confidence, etc., input corresponding to that gesture can be accepted 622. In at least some embodiments, this can correspond to accepting identifying information for a particular user, based upon recognition of a type of motion or gesture known or determined for that user. Various other approaches can be used as well as discussed or suggested elsewhere herein.

Figure 7:
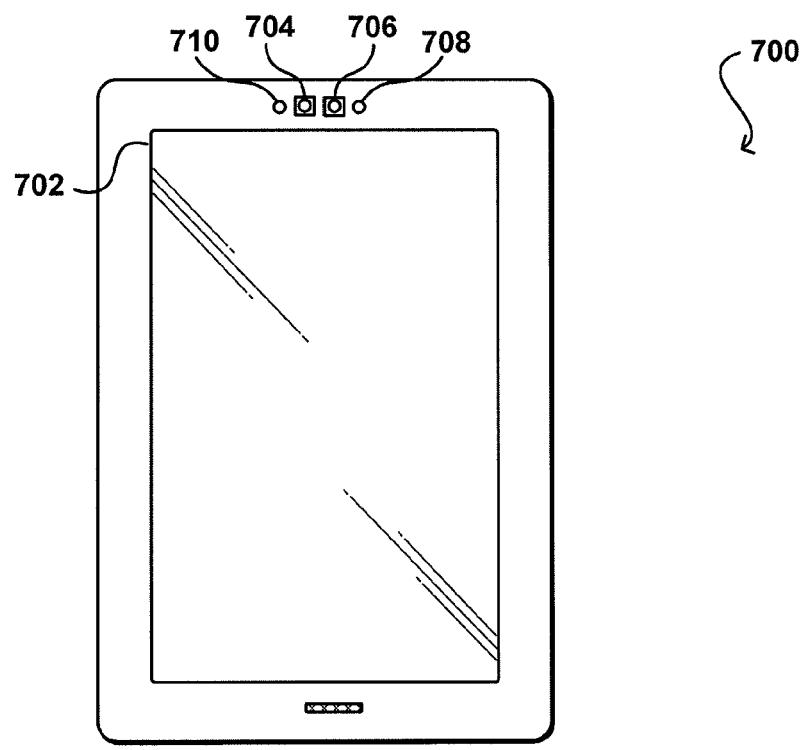
FIG. 7 illustrates an example computing device that can be used in accordance with various embodiments.

FIG. 7 illustrates an example computing device 700 that can be used to perform such a method in accordance with various embodiments. In this example, the device has a conventional digital camera 704 on a same side of the device as a display element 702, enabling the device to capture image information about a user of the device during typical operation where the user is at least partially in front of the display element. In at least some embodiments, the display element 702 can be a capacitive screen or other such element that is able to determine position of a feature of a user within a given distance (e.g., 3-5 cm) of the screen using capacitive measurements, and track a position of that feature over time. Information from the capacitive screen can be used instead of the image information, or in addition to the image information in order to improve accuracy and/or fill in motions where a feature of the user might be too close to the device to be adequately imaged by an imaging element, etc. In addition, the example computing device includes an infrared (IR) sensor 706 (or transceiver, etc.) positioned on the same side of the device that can be used to determine gesture input from the user when at relatively the same location. Such a configuration is useful when ambient light image information is subtracted from IR image information, but it should be understood that there can be additional or fewer cameras, sensors, or other such elements on the same or other sides or locations of the device as well within the scope of the various embodiments, such as may enable gesture or image input from any desired direction or location with respect to the device.

In this example, a light sensor 708 is included that can be used to determine an amount of light in a general direction of an image to be captured and at least one illumination element 710, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. Various other elements and combinations of elements can be used as well within the scope of the various embodiments as should be apparent in light of the teachings and suggestions contained herein.

Figure 8:
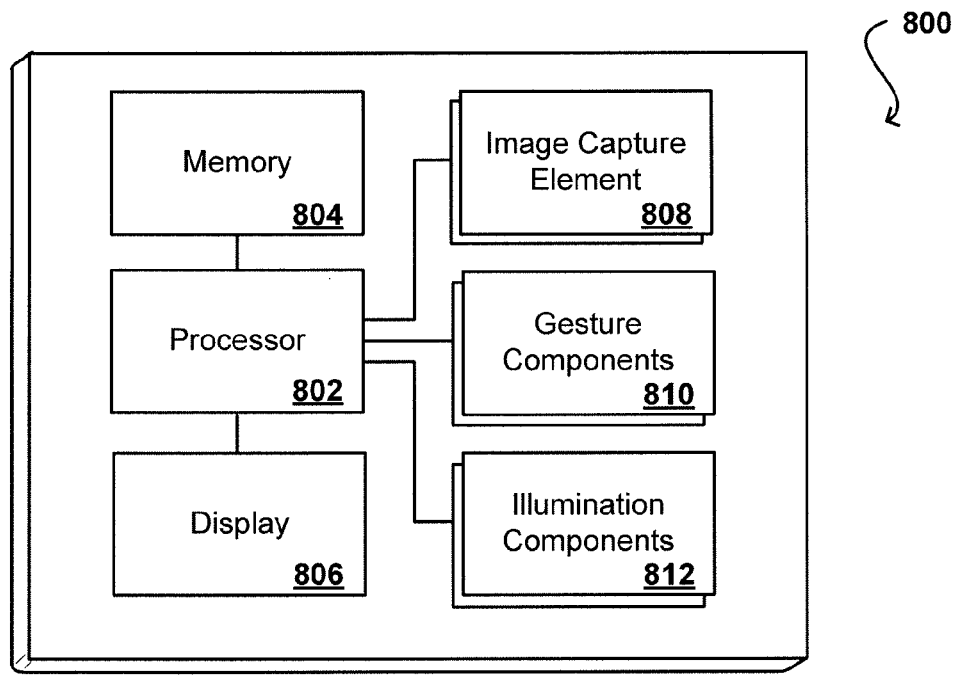
FIG. 8 illustrates an example configuration of components of a computing device such as that illustrated in FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can also include at least one separate gesture component 810, such as an IR sensor or detector, operable to capture information for use in determining gestures or motions of the user, which will enable the user to provide input through the portable device without having to actually contact and/or move the portable device. The device also can include at least one illumination element 812, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 9:
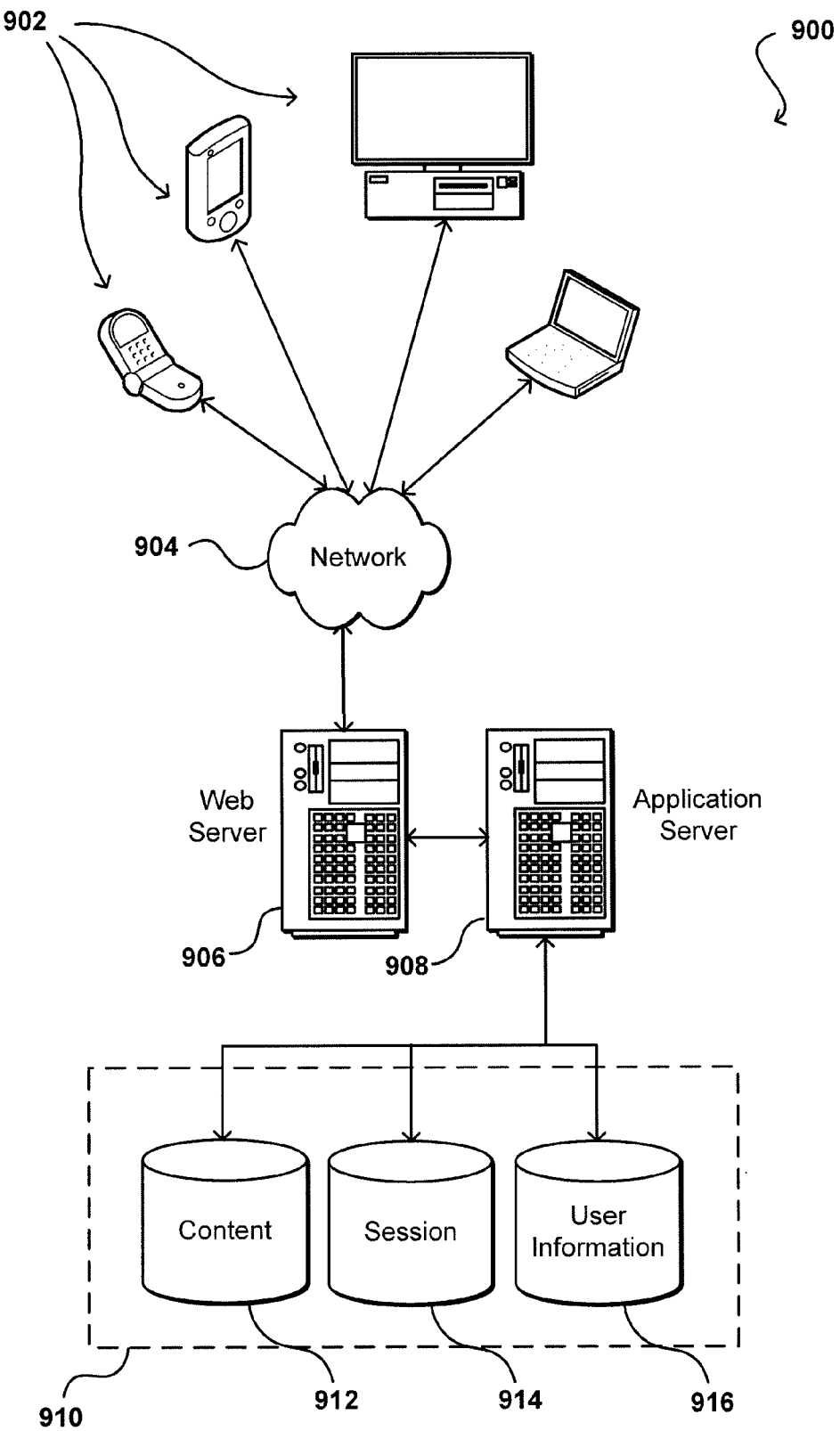
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of identifying an authorized user of a computing device, comprising:
    capturing image information using at least one image capture element of the computing device;
    analyzing, by the computing device, the image information to identify a position of at least one feature of a person near the computing device;
    tracking the at least one feature over a period of time in the image information;
    determining, by the computing device, a set of points including both position and time information for the at least one feature during at least a portion of the period of time;
    comparing the set of points to at least one gesture pattern stored for the authorized user of the computing device, the at least one gesture pattern including: (a) a path of movement for a gesture, (b) at least one of relative timing, acceleration, or velocity information for a plurality of points along the path of movement, and (c) one or more user-specific measurements relating to a manner of the authorized user performing the gesture; and
    providing an indication that the person is the authorized user of the computing device when the set of points matches the at least one gesture pattern stored for the authorized user with at least a minimum level of certainty.

2. The computer-implemented method of claim 1, wherein capturing image information is performed in response to detecting motion near the computing device.

3. The computer-implemented method of claim 1, further comprising:
    authenticating an identity of the user;
    prompting the user to perform the gesture;
    capturing first image information corresponding to the user performing the gesture;
    analyzing the first image information to determine (a) the path of movement for the gesture, (b) the at least one of relative timing, acceleration, or movement for the gesture, and (c) the one or more user-specific measurements relating to the manner of performing the gesture; and
    storing gesture information to be used in subsequent identification of the user, the gesture information including at least one of (a) the path of movement for the gesture, (b) the at least one of relative timing, acceleration, or movement for the gesture, or (c) the one or more user-specific measurements relating to the manner of performing the gesture.

4. The computer-implemented method of claim 1, wherein the at least one gesture pattern stored for the authorized user further includes at least one of a continuous function, a set of trajectories, or at least one fit curve.

5. The computer-implemented method of claim 1, wherein the set of points includes position information in three dimensions.

6. The computer-implemented method of claim 1, wherein the at least one feature includes at least one of a hand, finger, eye, elbow, arm, or held object.

7. A computer-implemented method of identifying a user, comprising:
    under control of one or more computing devices including executable instructions,
        obtaining image information captured using at least one image capture element of a computing device;
        analyzing the image information to identify a position of at least one feature of a person near the computing device;
        obtaining tracked position information by tracking the position of the at least one feature over a period of time in the image information;
        comparing the tracked position information to gesture information stored for at least one gesture associated with the user, the gesture information including at least: (a) a path of movement associated with the at least one gesture, (b) relative timing information for at least portions of the path of movement, and (e) one or more measurements relating to a manner of the user performing the at least one gesture; and
        providing information indicating that the user is identified when the tracked position information matches the gesture information stored for the at least one gesture associated with the user.

8. The computer-implemented method of claim 7, wherein the image information includes at least one of ambient light image information or reflected infrared image information.

9. The computer-implemented method of claim 8, further comprising:
    subtracting a weighted amount of the ambient light image information from the reflected infrared image information in order to substantially remove background information from the reflected infrared image information.

10. The computer-implemented method of claim 7, wherein analyzing the image information to identify the position of the at least one feature of the person uses at least one of image recognition, proximity detection, or intensity analysis.

11. The computer-implemented method of claim 7, wherein the gesture is a static gesture for the period of time.

12. The computer-implemented method of claim 7, wherein the gesture includes motion over the period of time.

13. The computer-implemented method of claim 7, wherein the position of the at least one feature is capable of being determined in two or three dimensions.

14. The computer-implemented method of claim 7, wherein the person is denied access to at least some content or functionality on the computing device when the tracked position information does not match the gesture information stored for the user with at least a minimum level of certainty.

15. The computer-implemented method of claim 7, further comprising:
  causing at least one source of illumination to be activated during at least a portion of the period of time in which the tracked position information is obtained.

16. The computer-implemented method of claim 15 wherein the at least one source of illumination includes at least one of a white light or an infrared source of illumination, each of which is activated continuously or periodically during the period of time.

17. The computer-implemented method of claim 7, wherein at least one feature includes at least one of a hand, finger, eye, elbow, arm, or held object.

18. The computer-implemented method of claim 7, further comprising:
  storing the image information in a rolling buffer,
  wherein analyzing the image information occurs after a fixed period of time of storing the image information.

19. The computer-implemented method of claim 7, further comprising:
  fitting a curve or function to the tracked position information before comparing the tracked position information to the gesture information.

20. The computer-implemented method of claim 7, further comprising:
  deactivating a gesture input mode if no gesture is detected within a specified period of inactivity.

21. The computer-implemented method of claim 7, wherein the position of the at least one feature of the person near the computing device is further capable of being identified and tracked over the period of time using a capacitive screen operable to detect position and motion within a given distance of the capacitive screen.

22. A computing device, comprising:
  a device processor;
  at least one image capture element; and
  a memory device including instructions operable to be executed by the processor to perform a set of actions, enabling the computing device to:
    obtain image information captured using the at least one image capture element;
    analyze the image information to identify a position of at least one feature of a person near the computing device;
    obtain tracked position information by tracking the position of the at least one feature over a period of time in the image information;
    compare the tracked position information to gesture information stored for at least one gesture associated with a user, the gesture information including at least: (a) a path of movement associated with the at least one gesture, (b) relative timing information for at least portions of the path of movement, and (c) one or more measurements relating to a manner of the user performing the at least one gesture; and
    provide information indicating that the user is identified when the tracked position information matches the gesture information stored for the at least one gesture associated with the user.

23. The computing device of claim 22, further comprising:
  at least one source of illumination operable to provide at least one of a white light or infrared radiation, each of which is continuously or periodically activated during the period of time at which the image information is obtained.

24. The computing device of claim 22, further comprising:
  a rolling data buffer operable to store the image information,
  wherein the instructions when executed to cause the processor to analyze the information occurs after a fixed period of time at which the image information is stored.

25. A non-transitory computer-readable storage medium storing instructions that, when executed by a processor, cause the processor to:
  obtain image information captured using at least one image capture element of a computing device;
  analyze the image information to identify a position of at least one feature of a person near the computing device;
  obtain tracked position information by tracking the position of the at least one feature over a period of time in the image information;
  compare the tracked position information to gesture information stored for at least one gesture associated with a user, the gesture information including at least: (a) a path of movement associated with the at least one gesture, (b) relative timing information for at least portions of the path of movement, and (c) one or more measurements relating to a manner of the user performing the at least one gesture; and
  provide information indicating that the user is identified when the tracked position information matches the gesture information stored for the at least one gesture associated with the user.

26. The non-transitory computer-readable storage medium of claim 25, wherein the image information includes ambient light image information and reflected infrared image information, and the instructions when executed further cause the processor to:
  subtract a weighted amount of the ambient light image information from the reflected infrared image information in order to substantially remove background information from the reflected infrared image information.

27. The non-transitory computer-readable storage medium of claim 25, wherein the instructions when executed further cause the processor to determine the position of the at least one feature in two or three dimensions.

* * * * *